United States Patent
Kurumida

[11] Patent Number: 5,506,941
[45] Date of Patent: Apr. 9, 1996

[54] PATTERN GENERATION METHOD AND PATTERN GENERATION APPARATUS

[75] Inventor: Tsuneaki Kurumida, Kawasaki, Japan

[73] Assignee: Canon Kabushiki Kaisha, Tokyo, Japan

[21] Appl. No.: 425,987

[22] Filed: Apr. 20, 1995

Related U.S. Application Data

[63] Continuation of Ser. No. 962,051, Oct. 16, 1992, abandoned, which is a continuation of Ser. No. 610,933, Nov. 9, 1990, abandoned.

[30] Foreign Application Priority Data

Nov. 13, 1989 [JP] Japan ..................... 1-294250

[51] Int. Cl.⁶ ............................. G06K 15/00
[52] U.S. Cl. ............................. 395/110; 395/109
[58] Field of Search ..................... 395/109, 910; 358/458, 471, 298; 345/141, 142, 143, 144, 145, 89; 400/120.07, 120.09

[56] References Cited

U.S. PATENT DOCUMENTS

| | | | |
|---|---|---|---|
| 4,578,713 | 3/1986 | Tsao | 358/298 |
| 4,800,442 | 1/1989 | Riseman | 358/298 |
| 4,907,282 | 3/1990 | Daly et al. | 395/110 |
| 4,963,898 | 10/1990 | Kadowaki et al. | 346/157 |
| 4,969,053 | 11/1990 | Outa et al. | 358/458 |
| 5,018,883 | 5/1991 | Fujita | 340/739 |

FOREIGN PATENT DOCUMENTS

| | | |
|---|---|---|
| 0216536 | 1/1987 | European Pat. Off. ........ 395/109 |
| 63-10135 | 1/1988 | Japan . |
| 63-10136 | 1/1988 | Japan . |
| 63-10140 | 1/1988 | Japan . |
| 63-10142 | 1/1988 | Japan . |

*Primary Examiner*—Arthur G. Evans
*Attorney, Agent, or Firm*—Fitzpatrick, Cella, Harper & Scinto

[57] ABSTRACT

In a pattern generation method, corresponding binary bit map data is generated based on a desired one of vector font data, an area of the binary bit map data on a memory is divided to judge a density in a predetermined area, and digital multi-value data is generated in correspondence with the judged density. There is also disclosed a pattern generation apparatus for carrying out this method.

44 Claims, 5 Drawing Sheets

PATTERN GENERATION METHOD AND PATTERN GENERATION APPARATUS

This application is a continuation of application Ser. No. 07/962,051, filed Oct. 16, 1992, now abandoned, which was a continuation of application Ser. No. 07/610,933 filed Nov. 9, 1990, now abandoned.

BACKGROUND OF THE INVENTION

1. Field of the Invention

The present invention relates to a pattern generation method and apparatus which can be applied to an output device capable of expressing gradation.

2. Related Background Art

When a gray scale font which can express gradation is assumed, it can be stored in a character generator in a bit map format, i.e., in a format in which multi-value data is added to one dot.

However, when font data is stored in the bit map format, the following problems are posed:

(1) A font cannot be enlarged or reduced to an arbitrary size.

(2) Since multi-value data is stored in the bit map format, data size is increased, and a memory having a large capacity is required for storing fonts.

SUMMARY OF THE INVENTION

According to the present invention, a font such as a vector font which can be arbitrarily enlarged or reduced can be expressed by gray scale levels by utilizing binary pattern data without increasing the memory capacity necessary for fonts.

It is an object of the present invention to provide a pattern generation apparatus which converts a vector font into a binary bit map pattern, and generates, based on the binary bit map pattern, digital multi-value data in correspondence with a density based on a bit pattern distribution.

It is another object of the present invention to provide a pattern generation method and apparatus, for generating multi-value data on the basis of a vector font, converting the multi-value data into an analog image signal, and comparing the analog image signal with a triangular wave having a predetermined period to pulse-width modulate it, thereby outputting a gradation pattern.

DETAILED DESCRIPTION OF THE PREFERRED EMBODIMENTS

Figure 1:
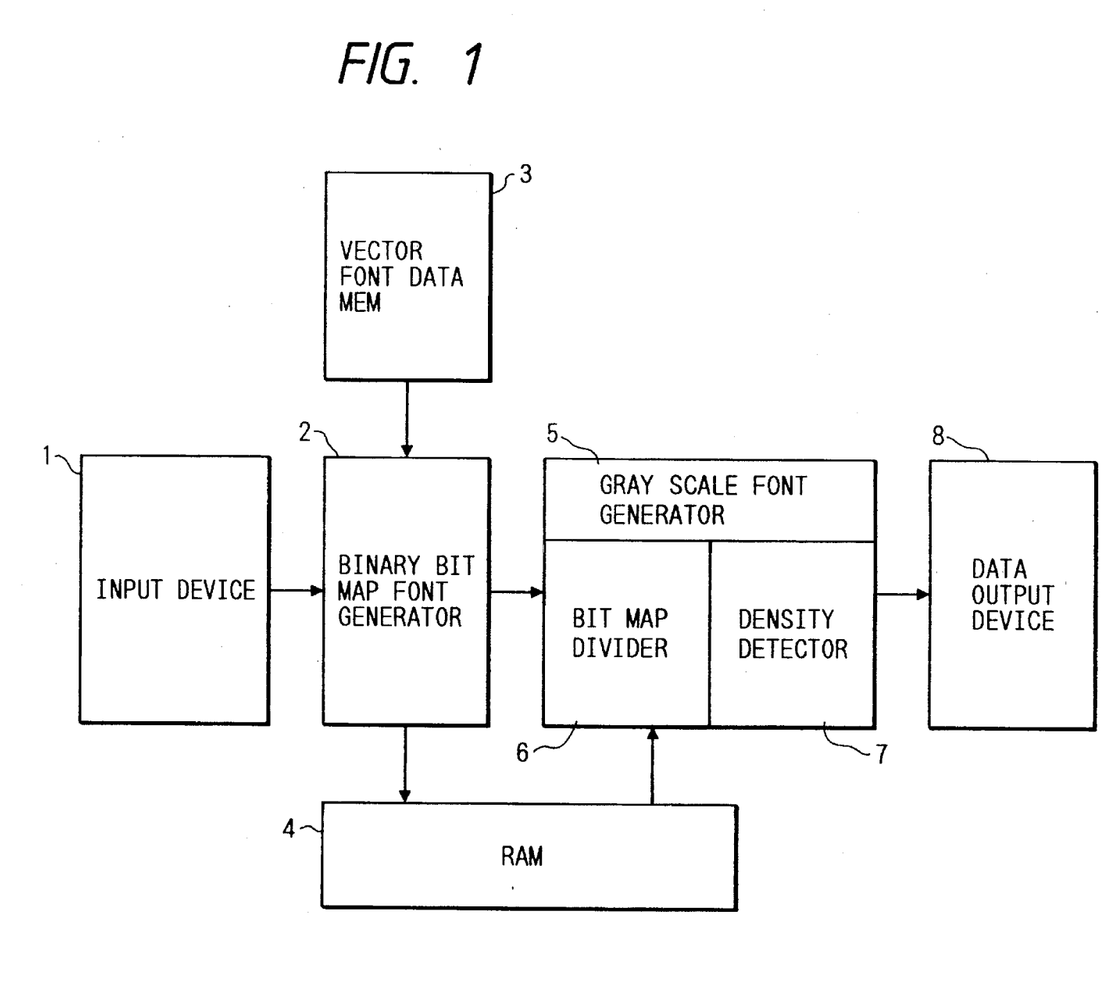
FIG. 1 is a block diagram of a character generator according to an embodiment of the present invention.

FIG. 1 best illustrates the characteristic feature of the present invention. In FIG. 1, an input device 1 receives an instruction to a character generator. A binary bit map font generator 2 generates a bit map font on the basis of vector data. A vector font data memory 3 stores vector font data of characters to be generated by the binary bit map font generator 2. A RAM 4 stores the bit map font data generated by the binary bit map font generator 2, and supplies the bit map data to a gray scale font generator 5. The gray scale font generator 5 generates a gray scale font on the basis of the bit map data generated by the binary bit map font generator 2. A bit map divider 6 divides the bit map data according to gray scale levels. A density detector 7 detects the densities of areas divided by the bit map divider 6. A data output device 8 supplies the densities detected by the detector 7 to an output apparatus comprising the character generator shown in FIG. 1. In general, the character generator is assembled in a printer or a display device.

Figure 2A:
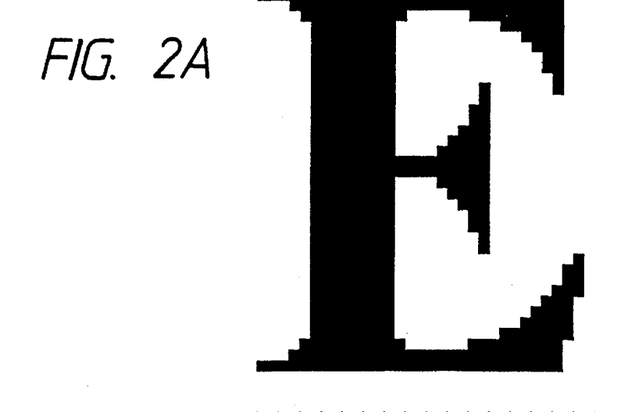
FIGS. 2A to 2C are views showing a procedure for generating a gray scale font according to the present invention.
Figure 2B:
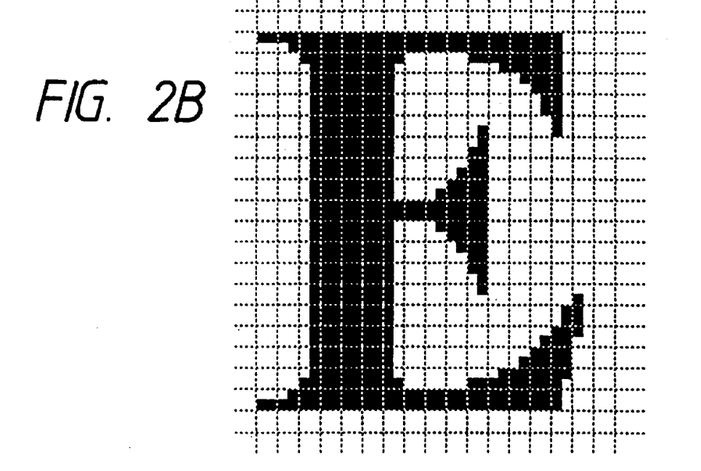
Figure 2C:
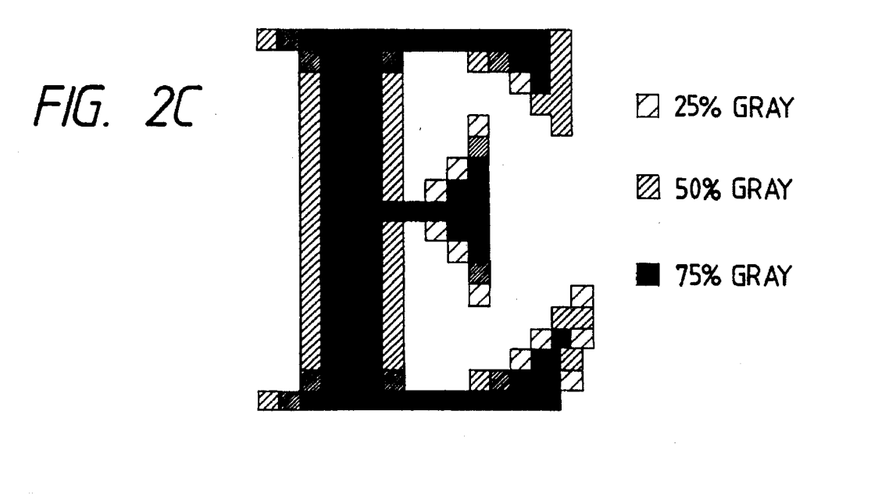

FIGS. 2A to 2C show a procedure of operations of the character generator according to the present invention. FIG. 2A illustrates bit map font data generated by the binary bit map font generator 2, and a binary character of a bit map is generated based on a vector font. In this case, in order to obtain a necessary gray scale level, a character is generated with a resolution higher than an output resolution. When the size (resolution) of a character in a memory is set to be m×n binary pixels per image dot (m and n being positive integers), gradation of m×n+1 levels can be obtained. That is, m and n are set to satisfy the relation that the output resolution of the device $\leq$ m×n+1. In this embodiment, since 25%, 50%, and 75% gray levels are adopted, five gray levels are available (including the 0% and 100% levels,) and m=n=2 is set. Therefore, a character is generated at a ×2 resolution in both the vertical and the horizontal directions. FIG. 2B shows a bit map divided by the bit map divider. Since a character has ×2 resolutions in both the vertical and horizontal directions, the character is divided in units of 2 dots (vertical direction) ×2 dots (horizontal direction) areas. FIG. 2C shows detected densities based on the density-divided bit map. If there is one dot in a divided area, this area can be expressed by a 25% gray level; if there are two dots, it can be expressed by a 50% gray level; and if there area three dots, it can be expressed by a 75% gray level. As a matter of course, if there is no dot, the area is expressed by white, and if there are four dots, it is expressed by black. Densities detected in this manner can be directly output to an apparatus comprising this character generator (e.g., a print buffer) as outputs of the character generator, e.g., digital multi-value (e.g., 4-bit) data. Thus, a memory capacity can be reduced as compared to a case wherein digital multi-value data is adopted as a font, and a high-quality output can be obtained.

Figure 3:
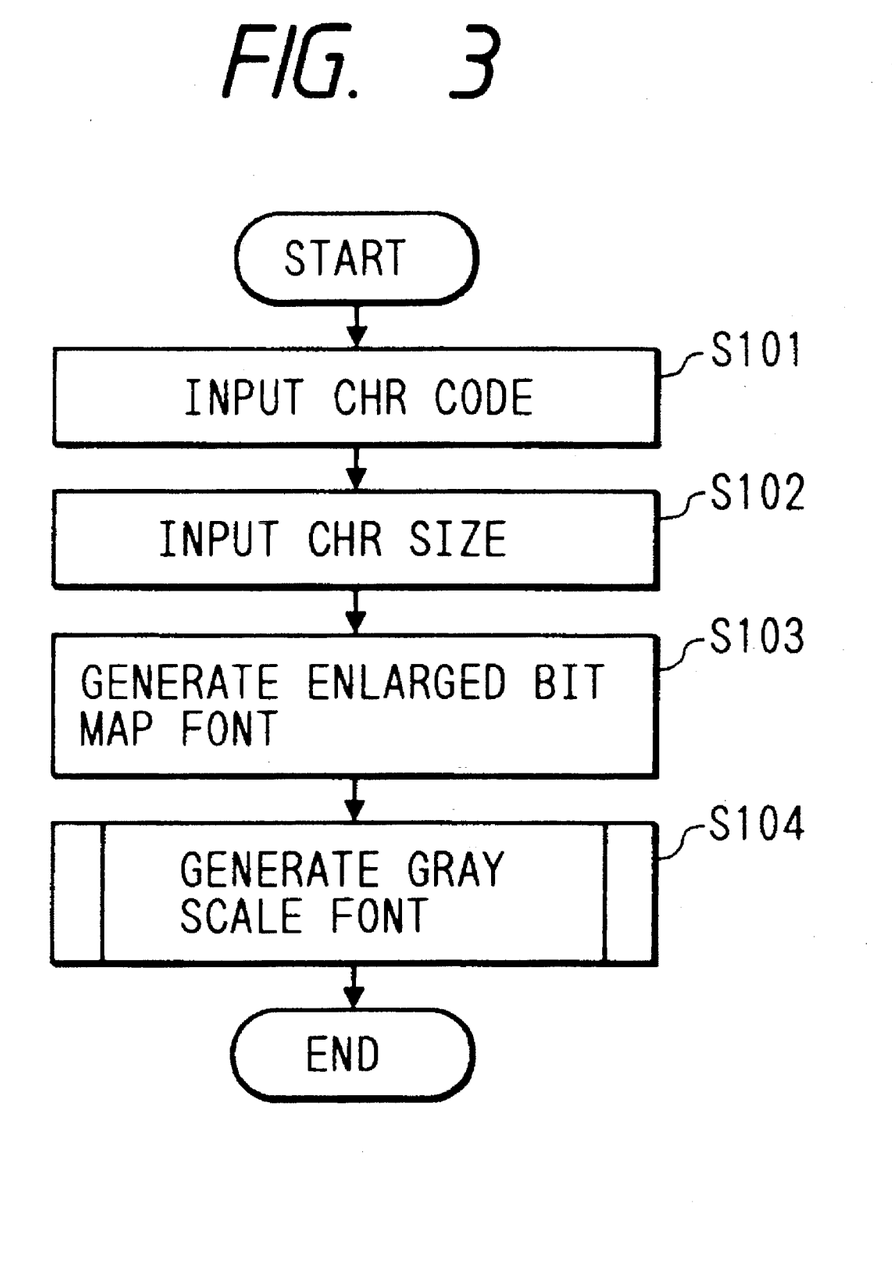
FIGS. 3 and 4 are flow charts showing control sequences of the present invention.
Figure 4:
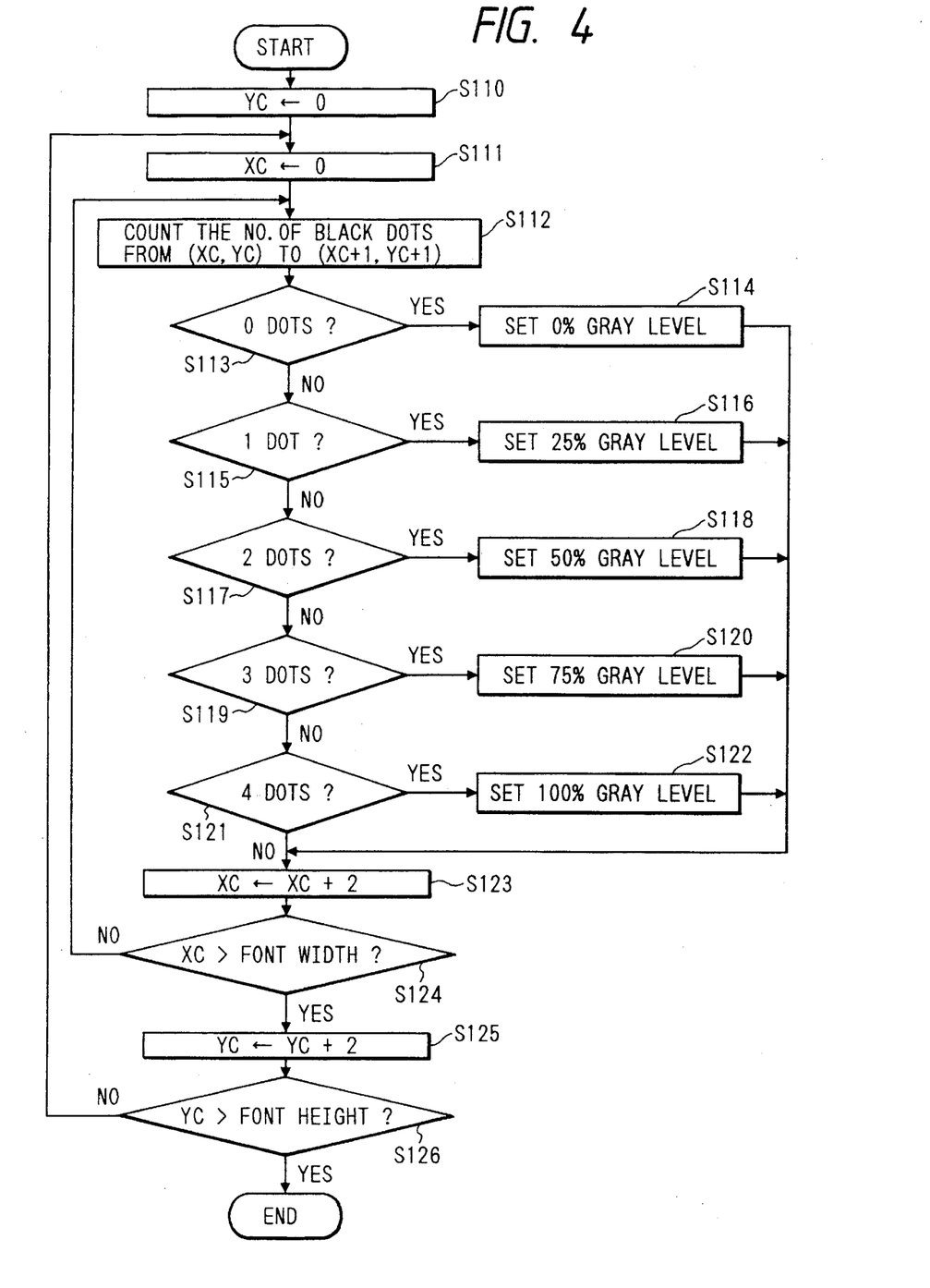

FIGS. 3 and 4 are flow charts showing a sequence for generating a gray scale font according to the present invention. This processing is executed by a CPU for controlling the overall output apparatus (not shown) on the basis of a program. FIG. 3 shows a sequence from the beginning to the end of character generation. In step S101 in FIG. 3, the input device 1 inputs a code of a character to be generated. In step S102, the input device 1 designates the size of a character to be generated. In step S103, a bit map font whose character size is enlarged twice in the example discussed above in both the vertical and horizontal directions is generated by the binary bit map font generator 2 on the basis of vector font data stored in the vector font data memory 3, and is stored in the RAM 4. More specifically, an original one dot is expressed by 2×2 dots, and a dot distribution in the 2×2 dot area is checked. The character size is enlarged twice in both the vertical and horizontal directions since the five gray levels, i.e., 0%, 25%, 50%, 75%, and 100% are available. If the number of gray levels is changed, the enlargement magnification is also changed. In step S104, a gray scale font is generated on the basis of the bit map generated in step S103. FIG. 4 shows in detail the processing in step S104.

FIG. 4 is a flow chart showing a sequence for generating gray scale font data, and this processing is executed by the gray scale font generator 5. In step S110 in FIG. 4, a vertical check position YC is set to be 0. In step S111, a horizontal check position XC is set to be 0. The bit map divider 6 executes step S112 using the bit map font generated on the RAM 4. In step S112, the number of black dots included between a position (XC,YC) and a position (XC+1,YC+1) is counted. The number of black dots included between the position (XC,YC) and the position (XC+1,YC+1) can take on value falling within the range of 0 to 4 inclusive. In step S113, the density detector 7 checks if the number of black dots is 0. If YES in step S113, step S114 is executed. In step S114, the gray level at the position (XC,YC) of the gray scale font is set to be 0%. In step S115, the density detector 7 checks if the number of black dots is 1. If YES in step S115, step S116 is executed. In step S116, the gray level at the position (XC,YC) is set to be 25%. In step S117, the density detector 7 checks if the number of black dots is 2. If YES in step S117, step S118 is executed. In step S118, the gray level at the position (XC,YC) is set to be 50%. In step S119, the density detector 7 checks if the number of black dots is 3. If YES in step S119, step S120 is executed. In step S120, the gray level at the position (XC,YC) is set to be 75%. In step S121, the density detector 7 checks if the number of black dots is 4. If YES in step S121, step S122 is executed. In step S122, the gray level at the position (XC,YC) is set to be 100%. The set value is output from the data output device 8. In step S123, "2" is added to XC. In this case, the value to be added is a horizontal enlargement magnification in step S103 in FIG. 3. In step S124, it is checked if XC exceeds the width of the bit map font. If YES in step S124, step S125 is performed. If NO in the process returns to step S124, step S112 which is again executed. In step S125, "2" is added to YC. In this case, the value to be added is a vertical enlargement magnification in step S103 in FIG. 3. In step S126, it is checked if YC exceeds the length of the bit map font. If YES in step S126, gray scale font data generation processing is ended; otherwise, step S111 is executed.

An apparatus for generating a bit map font based on a vector font has already been used in "Laser Writer" (registered trademark) (available from Apple Computer Inc.) or in "EZPS" (registered trademark) (available from CANON INC.) An apparatus of this type selectively generates bit map data according to one vector font data based on data, e.g., a character code, and is known to those who are skilled in the art. In this embodiment, a bit map font is generated based on a vector font. Alternatively, a bit map font having a predetermined size may be stored in the RAM 4 in step S103 in FIG. 3.

As described above, a gray scale font having an arbitrary size can be easily generated by a simple system.

Figure 5:
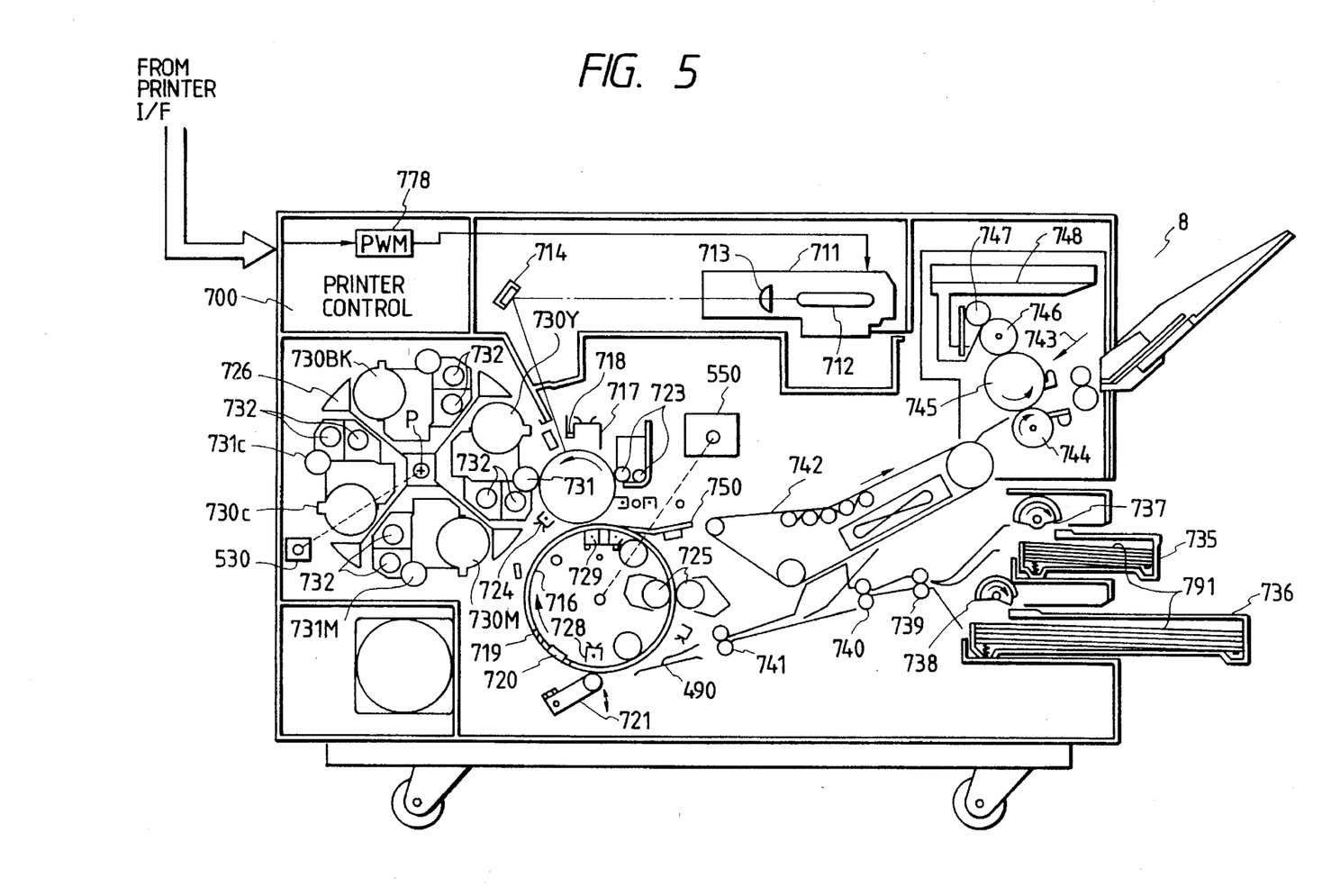
FIG. 5 is a sectional view for explaining an arrangement of an output apparatus.

A printer as an example of the data output device 8 shown in FIG. 1 will be briefly described below with reference to FIG. 5. A PWM (pulse-width modulation) circuit 778 converts a multi-value digital image signal (signal illustrated in FIG. 2C) from a printer I/F (not shown) into an analog image signal, and compares this analog image signal with a triangular wave having a predetermined period, thus forming a PWM signal. Note that the printer I/F includes a print buffer. The PWM signal is applied to a laser output device 711 to ON/OFF-modulate a laser, thereby forming a gradation image. The laser output device or scanner 711 includes a laser output unit for converting an image signal from the PWM circuit 778 into a light signal, a polygonal (e.g., octahedral) mirror 712, a motor (not shown) for rotating this mirror 712, and an f/θ lens (focusing lens) 713, and the like. The printer also includes a reflection mirror 714 for changing the optical path of a laser beam, and a photosensitive drum 715. A laser beam emerging from the laser output unit is reflected by the polygonal mirror 712, and linearly scans (raster-scans) the surface of the photosensitive drum 715 via the lens 713 and the mirror 714, thereby forming a latent image corresponding to an original image.

The printer also includes a primary charger 717, an entire surface exposure lamp 718, a cleaner unit 723 for recovering residual toner which is not transferred, and a pre-transfer charger 724. These members are arranged around the photosensitive drum 715.

A developing unit 726 develops an electrostatic latent image formed on the surface of the photosensitive drum 715. The developing unit 726 is constituted by developing sleeves 731Y, 731M, 731C, and 731Bk which selectively contact the photosensitive drum 715 to develop the latent image, toner hoppers 730Y, 730M, 730C, and 730Bk for storing replenishing toners, and screws 732 for transferring the toners. These members are arranged around a rotational shaft P of the developing unit. For example, when a yellow toner image is to be formed, yellow toner development is performed at the illustrated position. When a magenta toner image is to be formed, the developing unit 726 is rotated about the shaft P shown in FIG. 5, so that the developing sleeve 731M in the magenta developing device is placed at a position where it can contact the photosensitive drum 715. The same applies to cyan and black development operations.

The printer further includes a transfer drum 716 for transferring a toner image formed on the photosensitive drum 715 onto a paper sheet, an actuator plate 719 for detecting a moving position of the transfer drum 716, a position sensor 720 which comes closer to the actuator plate 719 to detect that the transfer drum 716 is moved to a home position, a transfer drum cleaner 725, a sheet press roller 727, a discharger 728, and a transfer charger 729. These members 719, 720, 725, 727, and 729 are arranged around the transfer roller 716.

The printer also includes paper feed cassettes 735 and 736 for storing paper sheets, paper feed rollers 737 and 738 for feeding paper sheets from the cassettes 735 and 736, and timing rollers 739, 740, and 741. A paper sheet 791 fed and conveyed via these rollers is guided by a paper guide 749, is wound around the transfer drum 716 while its leading end is carried by a gripper (to be described later), and is then subjected to an image formation process.

A drum motor 550 synchronously rotates the photosensitive drum 715 and the transfer drum 716. A separation pawl 750 separates a paper sheet from the transfer drum 716 after the image formation process. A conveyor belt 742 conveys the separated paper sheet. An image fixing unit 743 fixes an image formed on the paper sheet conveyed by the conveyor belt 742. The image fixing unit 743 comprises a pair of thermocompression rollers 744 and 745. As a printer for outputting a gradation image, an ink-jet printer for performing recording using an ink may be employed, and the ink dot size or the number of ink droplets may be controlled to output a gradation image.

As described above, according to the present invention, there can be provided a pattern generation apparatus comprising storage means for storing binary bit map data, judgment means for dividing an area of the bit map data stored in the storage means, and judging a density in a predetermined area, and generation means for generating corresponding digital multi-value data in accordance with the density judged by the judgment means.

As described above, according to the present invention, there can be provided a pattern generation method comprising the steps of generating corresponding binary bit map data based on desired one of vector font data, dividing an area of the binary bit map data on a memory, judging a density in a predetermined area, and generating digital multi-value data in correspondence with the judged density.

As described above, when a pattern division means and a density detection means are added to a character generator for generating a binary character pattern, a gray scale font having an arbitrary size or gray level can be generated.

What is claimed is:

1. A pattern generation apparatus for generating gray scale pattern data in accordance with vector data, said apparatus comprising:

means for inputting information on a size of a character to be generated;

means for deriving information on a size in converting vector data into bit map data on the basis of the output gradation capability of an output apparatus, the size represented by the derived information being larger than the size represented by the input information;

means for converting vector data into bit map data of the size represented by the derived information; and means for generating gray scale pattern data of the size represented by the input information on the basis of the bit map data converted by said converting means.

2. An apparatus according to claim 1, further comprising conversion means, having vector fonts, for converting desired data of the vector font into the binary.

3. An apparatus according to claim 1, further comprising printer means for, receiving the gray scale data, converting the multi-value data into an analog image signal, and comparing the analog image signal with a triangular wave having a predetermined period to form a pulse-width modulated signal.

4. An apparatus according to claim 1, further comprising printing means for controlling ink injection in accordance with the gray scale digital data to express gradation.

5. A pattern generation method for use in generating gray scale pattern data in accordance with vector data, said method comprising the steps of:

inputting information on a size of a character to be generated;

deriving information on a size in converting vector data into bit map data on the basis of the output gradation capability of an output apparatus, the size represented by the derived information being larger than the size represented by the input information;

generating bit map data of the size represented by the derived information; and generating gray scale pattern data of the size represented by the input information on the basis of the bit map data generated in said first-mentioned generating step.

6. A method according to claim 5, further comprising the step of judging a distribution state of a pattern in each of a plurality of areas of image.

7. A method according to claim 5, further comprising the step of receiving the gray scale data, converting the gray scale data into an analog image signal, and comparing the analog image signal with a triangular wave having a predetermined period to form a pulse-width modulated signal.

8. A pattern generation method comprising the steps of:

dividing an area of a binary character pattern, having a resolution larger than a resolution with which data is to be output, obtained by scaling vector data, into plural predetermined areas;

judging a density in a predetermined area obtained in said dividing step;

generating digital multi-value data in correspondence with the density judged in said judging step so as to generate a gray scale character pattern; and converting the multi-value digital data into an analog image signal, and comparing the analog image signal with a triangular wave having a predetermined period to pulse-width modulate the analog image signal, thereby outputting a gradation pattern.

9. A method according to claim 8, wherein the multi-value digital data is obtained by generating a binary character pattern based on the vector data, and judging a density based on a distribution of the binary character pattern.

10. A pattern generation apparatus comprising:

means for dividing an area of a binary character pattern, having a resolution larger than a resolution with which data is to be output, obtained by scaling vector data into plural predetermined area;

means for judging a density in a predetermined area obtained by said dividing means;

means for generating digital multi-value data in correspondence with the density judged by said judging means so as to generate a gray scale character pattern;

means for converting the multi-value digital data into an analog image signal, and comparing the analog image signal with a triangular wave having a predetermined period to obtain a pulse-width modulated signal; and laser output means for outputting a gradation image based on the pulse-width modulated signal obtained by said converting means.

11. An apparatus according to claim 10, wherein said generation means converts the vector data into the binary character pattern, and judges a density based on a distribution of the character pattern so as to generate the multi-value digital data.

12. A pattern generation method comprising:

dividing a character pattern area of a binary character pattern, having a resolution larger than a resolution with which data is to be output, stored in a memory into a plurality of areas, and judging a density in each of the plurality of areas; and generating corresponding digital multi-value data in accordance with the density judged in said dividing step so as to generate a gray scale character pattern.

13. A method according to claim 12, further comprising the step of converting desired data of vector fonts stored in another memory into the binary bit map data.

14. A method according to claim 12, further comprising the step of receiving the multi-value data, converting the multi-value data into an analog image signal, and comparing the analog image signal with a triangular wave having a predetermined period to form a pulse-width-modulated signal.

15. A method according to claim 12, further comprising the step of controlling ink ejection in accordance with the multi-value digital data to express gradation.

16. A pattern generation apparatus comprising:

means for generating a corresponding binary character pattern having a resolution larger than a resolution with which data is to be output based on a desired one of vector font data;

means for storing the binary character pattern generated by said character pattern generating means;

means for dividing a character pattern area of the binary character pattern stored in said storage means into a plurality of areas; and means for judging a density in each of the plurality of areas; and means for generating digital multi-value data in correspondence with the judged density so as to generate a gray scale character pattern.

17. An apparatus according to claim 16, wherein said judging means judges a distribution state of a pattern in the predetermined one area.

18. An apparatus according to claim 16, further comprising means for receiving the multi-value data, converting the multi-value data into an analog image signal, and comparing the analog image signal with a triangular wave having a predetermined period to form a pulse-width-modulated signal.

19. A pattern generation method comprising the steps of:

judging a density in a predetermined one of areas obtained by dividing a binary character pattern having a resolution larger than a resolution with which data is to be output obtained by scaling vector data;

generating digital multi-value data in correspondence with the density judged in said judging step so as to generate a gray scale character pattern; and converting the multi-value digital data into an analog image signal, and comparing the analog image signal with a triangular wave having a predetermined period to pulse-width modulate the analog image signal, thereby outputting a gradation pattern.

20. A pattern generation method comprising the steps of:

dividing an area of a binary character pattern having a resolution larger than a resolution with which data is to be output obtained by scaling vector data, into plural predetermined areas;

generating digital multi-value data in correspondence with a density in each of the plural areas so as to generate a gray scale character pattern; and converting the multi-value digital data into an analog image signal, and comparing the analog image signal with a triangular wave having a predetermined period to pulse-width modulate the analog image signal, thereby outputting a gradation pattern.

21. A pattern generation apparatus comprising:

means for judging a density in a predetermined one of areas obtained by dividing a binary character pattern having a resolution larger than a resolution with which data is to be output obtained by scaling vector data;

means for generating digital multi-value data in corresponding with the density judged by said judging means so as to generate a gray scale character pattern;

means for converting the multi-value digital data into an analog image signal, and comparing the analog image signal with a triangular wave having a predetermined period to obtain a pulse-width-modulated signal; and laser output means for outputting a gradation image based on the pulse-width modulated signal obtained by said converting means.

22. A pattern generation apparatus comprising:

means for dividing an area of a binary character pattern having a resolution larger than a resolution with which data is to be output obtained by scaling vector data, into plural predetermined areas;

means for generating digital multi-value data in correspondence with a density in each of the plural areas so as to generate a gray scale character pattern;

means for converting the multi-value digital data into an analog image signal, and comparing the analog image signal with a triangular wave having a predetermined period to obtain a pulse-width-modulated signal; and laser output means for outputting a gradation image based on the pulse-width modulated signal obtained by said converting means.

23. A method according to claim 19, further comprising the step of inputting a character code.

24. A method according to claim 20, further comprising the step of inputting a character code.

25. An apparatus according to claim 21, further comprising means for inputting a character code.

26. An apparatus according to claim 22, further comprising means for inputting a character code.

27. A method according to claim 19, further comprising the step of generating information indicating a size of a character to be output.

28. A method according to claim 20, further comprising the step of generating information indicating a size of a character to be output.

29. An apparatus according to claim 21, further comprising means for generating information indicating a size of a character to be output.

30. An apparatus according to claim 22, further comprising means for generating information indicating a size of a character to be output.

31. An apparatus according to claim 1, wherein the generated bit map data are output to a display.

32. A method according to claim 5, wherein the generated bit map data are output to a display.

33. A method according to claim 22, wherein the generated digital multi-value data are output to a display.

34. An apparatus according to claim 16, wherein the generated digital multi-value data are output to a display.

35. An apparatus according to claim 1, wherein the bit map data generated by said generation means are output in color.

36. A method according to claim 5, wherein the data generated in said generating step are output in color.

37. A method according to claim 8, wherein the output data are output in color.

38. An apparatus according to claim 10, in which the output gradation image is output in color.

39. A method according to claim 12, in which the data generated in said generating step are output in color.

40. An apparatus according to claim 16, in which the data generated by said generating means are output in color.

41. A method according to claim 19, wherein the gradation pattern is output in color.

42. A method according to claim 20, wherein the gradation pattern is output in color.

43. An apparatus according to claim 21, wherein the gradation image is output in color.

44. An apparatus according to claim 22, wherein the gradation image is output in color.

* * * * *

UNITED STATES PATENT AND TRADEMARK OFFICE
CERTIFICATE OF CORRECTION

PATENT NO. : 5,506,941

DATED : April 9, 1996

INVENTOR(S) : TSUNEAKI KURUMIDA ET AL.

It is certified that error appears in the above-identified patent and that said Letters Patent is hereby corrected as shown below:

COLUMN 2

Line 27, "levels,)" should read --levels),--.
Line 28, "set" should read --set.--.
Line 37, "area" should read --are--.
Line 57, "twice in" should read --twice (in--
and "above" should read --above)--.

COLUMN 3

Line 12, "value" should read --a value-- and
"4" should read --4,--.
Line 34, "the process" should be deleted.
Line 35, "returns to step S124, step S112" should read
--step S124, the process returns to step S112,--.
Line 46, "INC.)" should read --INC.).--.

COLUMN 5

Line 34, "binary." should read --binary bit map data.--.
Line 36, "for," should read --for-- and
"gray scale" should read --gray scale pattern--.
Line 37, "multi-value" should read --gray scale pattern--.
Line 43, "digital" should be deleted.
Line 64, "gray scale" should read --gray scale pattern--.
Line 65, "scale" should read --scale pattern--.

COLUMN 6

Line 24, "area;" should read --areas;--.
Line 39, "generation" should read --generating--.

UNITED STATES PATENT AND TRADEMARK OFFICE
CERTIFICATE OF CORRECTION

PATENT NO. : 5,506,941
DATED : April 9, 1996
INVENTOR(S) : TSUNEAKI KURUMIDA ET AL.   Page 2 of 2

It is certified that error appears in the above-identified patent and that said Letters Patent is hereby corrected as shown below:

COLUMN 7

```
Line 18, "the-multi-value" should read
         --the multi-value--.
Line 56, "sponding" should read --spondence--.
```

Signed and Sealed this

Twelfth Day of November, 1996

Attest:

BRUCE LEHMAN

Attesting Officer   Commissioner of Patents and Trademarks